US009533532B2

(12) United States Patent
Cercy (10) Patent No.: US 9,533,532 B2
(45) Date of Patent: Jan. 3, 2017

(54) TIRE COMPRISING A PROTECTIVE REINFORCEMENT (75) Inventor: Laurent Cercy, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 308 days.

(21) Appl. No.: 13/822,359

(22) PCT Filed: Sep. 20, 2011

(86) PCT No.: PCT/EP2011/066277
§ 371 (c)(1),
(2), (4) Date: Apr. 1, 2013

(87) PCT Pub. No.: WO2012/038397
PCT Pub. Date: Mar. 29, 2012

(65) Prior Publication Data
US 2013/0220508 A1 Aug. 29, 2013

(30) Foreign Application Priority Data
Sep. 21, 2010 (FR) .................................. 10 57537

(51) Int. Cl.
*B60C 9/18* (2006.01)
*B60C 9/24* (2006.01)
*B60C 9/28* (2006.01)

(52) U.S. Cl.
CPC . *B60C 9/18* (2013.01); *B60C 9/24* (2013.01); B60C 2009/2035 (2013.04);
(Continued)

(58) Field of Classification Search
CPC ............ B60C 9/18; B60C 9/1807; B60C 9/24; B60C 9/28
See application file for complete search history.

(56) References Cited

U.S. PATENT DOCUMENTS 4,867,937 A 9/1989 Li et al.
4,876,137 A 10/1989 Utsumi
(Continued)

FOREIGN PATENT DOCUMENTS

CN 1822963 8/2006
CN 101585295 11/2009
(Continued)

OTHER PUBLICATIONS

International Search Report (PCT/ISA/210) issued on Oct. 31, 2011, by the European Patent Office as the International Searching Authority for International Application No. PCT/EP2011/066277.

*Primary Examiner* — Justin Fischer
(74) *Attorney, Agent, or Firm* — Dickinson Wright PLLC (57) ABSTRACT The invention relates to a tire with a radial carcass reinforcement comprising a crown reinforcement, itself radially capped with a tread comprising at least two circumferentially continuous cutouts, the said tread being connected to two beads via two sidewalls.

According to the invention, the crown reinforcement comprises at least one axially discontinuous layer consisting of at least two bands each formed of at least one multilayer laminate, the said laminate comprising at least one multi-axially stretched thermoplastic polymer film positioned between and in contact with two layers of rubber composition, and, in a meridian plane, the axial ends of each of the said bands being respectively axially on the outside of each of the axially outermost points of one same circumferentially continuous cutout.

12 Claims, 3 Drawing Sheets

(52) U.S. Cl.
CPC ............... *B60C 2009/2041* (2013.04); *B60C 2009/2048* (2013.04); *B60C 2200/06* (2013.04); *Y10T 152/10765* (2015.01)

(56) References Cited

U.S. PATENT DOCUMENTS

| | | | |
|---|---|---|---|
| 5,156,921 A * | 10/1992 | Lin et al. | 428/521 |
| 5,228,933 A | 7/1993 | Kawabata et al. | |
| 5,409,657 A | 4/1995 | Gerwig et al. | |
| 5,417,266 A * | 5/1995 | Janus | 152/200 |
| 6,966,999 B2 * | 11/2005 | Tsou et al. | 264/291 |
| 9,134,471 B2 * | 9/2015 | Johnston | G02B 5/30 |
| 2006/0169380 A1 | 8/2006 | Radulescu et al. | |
| 2007/0031691 A1 | 2/2007 | Forloni et al. | |

FOREIGN PATENT DOCUMENTS

| | | |
|---|---|---|
| DE | 36 21 205 A1 | 1/1988 |
| EP | 0 229 346 A1 | 7/1987 |
| EP | 0 279 611 A2 | 8/1988 |
| EP | 0 414 470 A2 | 2/1991 |
| EP | 0414470 | 2/1991 |
| EP | 0 539 302 A1 | 4/1993 |
| FR | 1 389 428 A | 2/1965 |
| FR | 2 222 232 A1 | 10/1974 |
| FR | 2 539 349 A1 | 7/1984 |
| FR | 2 728 510 A1 | 6/1996 |
| GB | 1340687 * | 12/1973 |
| JP | 3-76841 * | 4/1991 |
| JP | 2005035345 | 2/2005 |
| JP | 2005254993 | 9/2005 |
| JP | 2008126437 | 6/2008 |
| WO | 99/24269 A1 | 5/1999 |
| WO | 2005/011978 A1 | 2/2005 |

\* cited by examiner

TIRE COMPRISING A PROTECTIVE REINFORCEMENT

The present invention relates to a tire with a radial carcass reinforcement and more particularly to a tire intended to be fitted to vehicles that carry heavy loads and drive at sustained speeds, such as, for example, lorries, tractors, trailers or road buses.

In general in tires of the heavy vehicle type, the carcass reinforcement is anchored on either side in the bead region and is radially surmounted by a crown reinforcement made up of at least two layers that are superposed and formed of threads or cords that are parallel within each layer and crossed from one layer to the next, making with the circumferential direction angles of between 10° and 45°. The said working layers, which form the working reinforcement, may be further covered by at least one layer termed a protective layer and formed of reinforcing elements that are advantageously metal and extensible, known as elastic elements. It may also comprise a layer of metal threads or cords with low extensibility making with the circumferential direction an angle of between 45° and 90°, this ply, known as the triangulation ply, being situated radially between the carcass reinforcement and the first so-called working crown ply, formed of threads or cords that are parallel and at angles of at most 45° in terms of absolute value. The triangulation ply makes with at least the said working ply a triangulated reinforcement which, under the various stresses it may experience, undergoes very little deformation, the triangulation ply having the essential role of reacting the transverse compressive loads to which all of the reinforcing elements are subjected in the crown region of the tire.

In the case of tires for "heavy" vehicles, there is usually just one protective layer and its protective elements are, in most cases, oriented in the same direction and at the same angle in terms of absolute value as those of the reinforcing elements of the working layer that is radially outermost and therefore radially adjacent. In the case of tires for construction plant intended to run on somewhat uneven ground, the presence of two protective layers is advantageous, the reinforcing elements being crossed from one layer to the next and the reinforcing elements of the radially inner protective layer being crossed with the inextensible reinforcing elements of the working layer that is radially outer and adjacent to the said radially inner protective layer.

Cords are said to be inextensible when the said cords have, under a tensile force equal to 10% of the breaking strength, a relative elongation of 0.2% at most.

Cords are said to be elastic when the said cords have, under a tensile force equal to the breaking strength, a relative elongation of at least 3% with a maximum tangent modulus of less than 150 GPa.

Circumferential reinforcing elements are reinforcing elements which make, with the circumferential direction, angles comprised in the range +8°, −8° about 0°.

The circumferential direction of the tire, or longitudinal direction, is the direction corresponding to the periphery of the tire and defined by the direction in which the tire runs.

The axis of rotation of the tire is the axis about which it revolves in normal use.

A radial or meridian plane is a plane containing the axis of rotation of the tire.

The circumferential median plane or equatorial plane is a plane perpendicular to the axis of rotation of the tire and which divides the tire into two halves.

The transverse or axial direction of the tire is parallel to the axis of rotation of the tire. An axial distance is measured in the axial direction.

The radial direction is a direction that intersects the axis of rotation of the tire and is perpendicular thereto. A radial distance is measured in the radial direction. The expression "radially on the inside of, or radially on the outside of" respectively means "of which the radial distance, measured from the axis of rotation of the tire, is respectively less than or greater than".

Some present-day tires, known as "road" tires, are intended to run at high speed over increasingly long distances, because of improvements to the road network and the expansion of the motorway network worldwide. Although all of the conditions under which such a tire is called upon to run undoubtedly allow an increase in the number of kilometers covered, because the tire wear is lower, this is at the expense of tire durability, particularly of crown reinforcement durability.

In order to improve the endurance of the crown reinforcement of the type of tire being studied, solutions relating to the structure and quality of the layers and/or profiled elements of rubber compounds which are positioned between and/or around the ends of plies and, more particularly, the ends of the axially shortest ply, have already been applied.

Patent FR 1 389 428, in order to increase the resistance to damage of the rubber compounds situated near the edges of the crown reinforcement, recommends the use, in combination with a low-hysteresis tread, of a rubber profiled element covering at least the sides and the marginal edges of the crown reinforcement and consisting of a low-hysteresis rubber compound.

Patent FR 2 222 232, in order to avoid separation between crown reinforcement plies, teaches the coating of the ends of the reinforcement in a rubber mat, the Shore A hardness of which differs from that of the tread surmounting the said reinforcement and is higher than the Shore A hardness of the profiled element of rubber compound positioned between the edges of crown reinforcing plies and carcass reinforcement.

French application FR 2 728 510 proposes positioning, on the one hand, between the carcass reinforcement and the working crown reinforcement ply radially closest to the axis of rotation, an axially continuous ply formed of inextensible metal cords making with the circumferential direction an angle of at least 60° and the axial width of which is at least equal to the axial width of the shortest working crown ply and, on the other hand, between the two working crown plies an additional ply formed of metal elements oriented substantially parallel to the circumferential direction.

To improve the endurance of the crown reinforcement of these tires, it has also been proposed that there be associated with the angle working crown layers at least one additional layer of reinforcing elements substantially parallel to the circumferential direction. French application WO 99/24269 proposes, notably, on each side of the equatorial plane and in the immediate axial continuation of the additional ply of reinforcing elements substantially parallel to the circumferential direction, that the two working crown plies formed of reinforcing elements that are crossed from one ply to the next be coupled over a certain axial distance and then decoupled by profiled elements of rubber compound at least over the remainder of the width common to the said two working plies.

The layer of circumferential reinforcing elements is usually made up of at least one metal cord wound to form a turn which is laid at an angle of less than 8° with respect to the circumferential direction.

Tires produced in this way have improved endurance properties which will notably make it possible to envisage retreading the tires when they have become worn. During the various retreading steps, it sometimes happens that tires are unable to be retreaded because they have experienced mechanical or chemical attack through the tread, which has impaired the crown reinforcement. As explained hereinabove in an attempt to combat these potential forms of attack, such tires comprise at least one protective layer the essential function of which is to protect the remainder of the crown reinforcement and the carcass reinforcement.

The nature of these protective layers and, more particularly, the nature of the reinforcing elements of which they are composed leads to a not-insignificant increase in the cost and weight of the tire.

The inventors therefore set themselves the task of supplying tires for heavy vehicles of the "heavy goods" type, the endurance and wear performance of which was preserved but the cost of manufacture of which was lower and advantageously with reduced weight.

This object was achieved according to the invention by a tire with radial carcass reinforcement, made up of at least one layer of metal reinforcing elements, the said tire comprising a crown reinforcement, itself radially capped by a tread comprising at least two circumferentially continuous cutouts, the said tread being connected to two beads via two sidewalls, the crown reinforcement comprising at least one axially discontinuous layer consisting of at least two bands each formed of at least one multilayer laminate, the laminate comprising at least one multiaxially stretched thermoplastic polymer film positioned between and in contact with two layers of rubber composition, and, in a meridian plane, the axial ends of each of the said bands being respectively axially on the outside of each of the axially outermost points of one same circumferentially continuous cutout.

Within the meaning of the invention, an axially discontinuous layer is a layer made up of at least two bands axially distant from one another.

Within the meaning of the invention the expression "axially on the inside of, or axially on the outside of" respectively means "of which the axial distance, measured from the median plane of a circumferentially continuous cutout, is respectively less than or greater than".

Within the meaning of the invention, a "laminate" or "multilayer laminate" corresponds to any product comprising at least two layers, of planar or non-planar shape, which are in contact with one another, it being possible for these layers either to be or not to be linked or connected together; the expression "linked" or "connected" has to be interpreted extensively to include all means of linkage or assembly, particularly by bonding.

The circumferentially continuous cutouts of the tread are, for example, circumferential grooves such as are found on heavy goods vehicle tires. These grooves have the notable function of removing water and also allow the tire to flatten better in the contact patch.

The expression "circumferentially continuous" means that the cutout runs all around the tire without interruption.

These grooves have a width and a depth that allow them to perform their functions which offer a passage to elements that could damage the tread, notably in the voids that these grooves form. Because the thickness of the tread is smaller in these grooved zones, notably because of their depth, the risk of the crown reinforcement and carcass reinforcement reinforcing elements becoming damaged is particularly high in these zones.

Advantageously, the said one axially discontinuous layer constitutes the radially outermost layer of the crown reinforcement.

According to one preferred embodiment of the invention, each axial end of the axially discontinuous layer is axially on the outside of the axially outermost point of the axially outermost circumferential cutout closest to a shoulder of the tire.

Notably in the case of a tire intended to be fitted to the driven axle of a vehicle, this preferred embodiment makes it possible to install a band formed of at least one multilayer laminate under each of the grooves of the tire.

In the case of a tire intended to be fitted to the steered axle of a vehicle, tests have shown that radial superposition of a band formed of at least one multilayer laminate with just some of the grooves; more specifically, an embodiment in which at least the two grooves axially closest to the shoulders of the tire which are not radially superposed with a band formed of at least one multilayer laminate, is enough to protect the crown and carcass reinforcement reinforcing elements.

The inventors have been able to demonstrate that a tire produced in this way according to the invention does effectively lead to results in terms of crown and carcass reinforcement protection that are entirely satisfactory. The multilayer laminate has a flexible and highly deformable structure which has proven, unexpectedly, to offer high resistance to piercing forces. It has been found that the protection afforded is equivalent to that of the protective layers mentioned previously which are reinforced with metal cords.

Tests have also demonstrated that the multilayer laminate also has the function of forming a barrier against water and oxygen, both of which elements are corrosive toward metal cords present in the layers that make up the crown reinforcement and the carcass reinforcement.

The inventors have also been able to demonstrate that the presence of an axially discontinuous layer made up of at least two bands each formed of at least one multilayer laminate may make it possible to dispense with the need for a protective layer while at the same time maintaining sufficient protection of the crown and carcass reinforcements against attack through the tread.

Furthermore, the thickness of this laminate and its weight are markedly lower than those of a protective layer. A final advantage of a laminate according to the invention is its cost, which is markedly lower than that of a layer of reinforcing elements intended to be used as protective layer.

According to one preferred embodiment of the invention, the axial distance between an axial end of a band and the axially outermost point of the circumferentially continuous cutout axially closest to the said end of the band is less than 12 mm.

According to this preferred embodiment of the invention, it is possible to limit the width of the bands and therefore the cost and weight thereof. Furthermore, such positioning of the ends of the bands so that they are radially superposed with the grooves nearest the shoulders of the tire makes it possible further to improve the endurance properties of the tire, the ends of the said bands being situated in zones of the tire tread that become the least heated.

According to one preferred embodiment of the invention, the axial distance between an axial end of a band and the axially outermost point of the circumferentially continuous cutout axially closest to the said end of the band is greater than 4 mm. Such a value guarantees protection against any attack that may come from inside the circumferentially continuous cutout.

When each axial end of the axially discontinuous layer is axially on the outside of the axially outermost point of the circumferential cutout axially closest to a shoulder of a tire, the axial distance between the axial end of the axially discontinuous layer and the axially outermost point of the circumferentially continuous cutout axially closest to a shoulder of the tire is therefore preferably greater than 4 mm and advantageously less than 12 mm.

According to preferred embodiments of the invention, the bands forming the axially discontinuous layer have widths of between 20 and 40 mm.

According to one advantageous embodiment of the invention, the crown reinforcement of the tire comprises at least two laminates positioned in contact with one another circumferentially to form a circumferentially continuous band.

Such an arrangement allows the laminates to undergo a tire-shaping operation, notably during the tire curing phase, without their properties being modified.

Advantageously also, the ends of the said at least two laminates are radially superposed in the circumferential direction in order to guarantee effective protection over the entire periphery. After the tire has been cured, this superposition of the ends is more advantageously still by at least 4 mm.

According to some preferred modes of embodiment according to these advantageous embodiments of the invention, the at least two laminates have substantially equivalent lengths in the circumferential direction.

Advantageously also, the ends of the said at least two laminates in the circumferential direction have a cutout that makes with the circumferential direction an angle substantially equivalent to that of the reinforcing elements of the crown reinforcing layer radially closest to the said at least two laminates.

According to the invention, any multiaxially stretched thermoplastic polymer film, which means to say one that is stretched, oriented in more than one direction, can be used. Such multiaxially stretched films are well known and are these days essentially used in the packaging industry, the agri-foodstuffs industry, the electrical field or else as a backing for magnetic coatings.

They are prepared according to various well-known stretching techniques, all aimed at giving the film superior mechanical properties in several main directions rather than in just one direction as is the case for conventional thermoplastic polymer (for example PET or "nylon") fibers which as is known are uniaxially stretched when they are being drawn in the molten state.

Such techniques call for multiple stretchings in several directions, longitudinal, transverse stretchings, planar stretchings. By way of example, mention may especially be made of the biaxial blow-stretching technique. The stretching operations may be performed in a single or as multiple operation(s), and the stretching operations where multiple may be simultaneous or sequenced. The degree or degrees of stretch applied are dependent on the target final mechanical properties, and are generally higher than 2.

Multiaxially stretched thermoplastic polymer films and methods of obtaining them have been described in many patent documents, for example in documents FR 2539349 (or GB 2134442), DE 3621205, EP 229346 (or U.S. Pat. No. 4,876,137), EP 279611 (or U.S. Pat. No. 4,867,937), EP 539302 (or U.S. Pat. No. 5,409,657) and WO 2005/011978 (or US 2007/0031691).

For preference, the thermoplastic polymer film used has, whatever direction of tension is considered, an extension modulus denoted E that is greater than 500 MPa (notably between 500 and 4000 MPa), more preferably greater than 1000 MPa (notably between 1000 and 4000 MPa), more preferably still, greater than 2000 MPa. Values of modulus E of between 2000 and 4000 MPa, particularly of between 3000 and 4000 MPa are particularly desirable.

According to another preferred embodiment, whatever direction of tension is considered, the maximum tensile stress denoted $\sigma_{max}$ of the thermoplastic polymer film is preferably greater than 80 MPa (notably between 80 and 200 MPa), more preferably greater than 100 MPa (notably between 100 and 200 MPa). Stress $\sigma_{max}$ values higher than 150 MPa, particularly of between 150 and 200 MPa, are particularly desirable.

According to another preferred embodiment, whatever direction of tension is considered, the threshold for plastic deformation, denoted Yp (also known by the name of "Yield point") of the thermoplastic polymer film is somewhere beyond 3%, notably between 3 and 15%, elongation. Yp values beyond 4%, particularly comprised between 4 and 12%, are particularly desirable.

According to another preferred embodiment, whatever direction of tension is considered, the thermoplastic polymer film has an elongation at break denoted Ar which is greater than 40% (notably between 40 and 200%), more preferably greater than 50%. Values of Ar of between 50 and 200% are particularly desirable.

The mechanical properties mentioned hereinabove are well known to those skilled in the art, deduced from force-elongation curves, measured for example in accordance with standard ASTM D638-02 for bands greater than 1 mm thick, or alternatively according to the standard ASTM D882-09 for thin sheets or films of a thickness of 1 mm at most; the values of modulus E and of stress $\sigma_{max}$ given hereinabove and expressed in MPa are calculated with respect to the initial cross section of the tensile test specimen.

The thermoplastic polymer film used is preferably of the heat stabilized type, which means to say that, after stretching, it has undergone one or more heat treatments aimed in the known way at limiting its high-temperature thermal contraction (or shrinkage); such heat treatments may notably involve annealings, temperings or combinations of such annealings or temperings.

Thus, and for preference, the thermoplastic polymer film used has, after 30 min at 150° C., a relative contraction of its length which represents less than 5%, preferably less than 3% (measured in accordance with ASTM D1204-08 unless otherwise specified).

The melting point of the thermoplastic polymer used is preferably chosen to be above 100° C., more preferably above 150° C., and in particular above 200° C.

The thermoplastic polymer is preferably selected from the group consisting of polyamides, polyesters and polyimides, more particularly from the group consisting of polyamides and polyesters. Of the polyamides, notable mention may be made of polyamide-4,6, 6, 6,6, 11 or 12. Of the polyesters, mention may be made, for example, of PET (polyethylene terephthalate), PEN (polyethylene naphthalate), PBT (polybutylene terephthalate), PBN (polybutylene naphthalate), PPT (polypropylene terephthalate), PPN (polypropylene naphthalate).

The thermoplastic polymer is preferably a polyester, more preferably a PET or PEN.

Examples of multiaxially stretched PET thermoplastic polymer films are, for example, the biaxially stretched PET films marketed under the trade names "Mylar" and "Melinex" (by DuPont Teijin Films), or alternatively "Hostaphan" (by Mitsubishi Polyester Film).

In the multilayer laminate of the invention, the thickness of the thermoplastic polymer film is preferably between 0.05 and 1 mm, more preferably between 0.1 and 0.7 mm and more preferably still, between 0.20 and 0.60 mm.

The thermoplastic polymer film may contain additives added to the polymer, notably at the time of the forming of the latter, it being possible for these additives for example to be anti-aging agents, plasticizers, fillers such as silica, clays, talc, kaolin or even short fibers; fillers may for example be used to roughen the surface of the film and thus contribute to improving its take-up of glue and/or its adhesion to the layers of rubber with which it is intended to be in contact.

According to one embodiment of the invention, each layer of rubber composition, or hereinafter "layer of rubber" that makes up the multilayer laminate according to the invention is based on at least one elastomer.

For preference, the elastomer is a diene elastomer. In the known way, diene elastomers can be classified into two categories: those which are "essentially unsaturated" and those which are "essentially saturated". "Essentially unsaturated" means a diene elastomer derived at least in part from conjugated diene monomers having a content of blocks or units of diene origin (conjugated dienes) higher than 15% (mol %); hence diene elastomers such as butyl rubbers or diene and alpha-olefin copolymers of the EPDM type do not fall under the above definition and can notably be qualified as "essentially saturated" diene elastomers (in which the content of blocks of diene origin is low or very low, always below 15%). Within the "essentially unsaturated" diene elastomers category a "highly unsaturated" diene elastomer means in particular a diene elastomer that has a content of blocks of diene origin (conjugated dienes) which is higher than 50%.

Although it applies to any type of diene elastomer, the present invention is preferably implemented using a diene elastomer of the highly unsaturated type.

This diene elastomer is more preferably selected from the group consisting of polybutadienes (BR), natural rubber (NR), synthetic polyisoprenes (IR), the various copolymers of butadiene, the various copolymers of isoprene and mixtures of these elastomers, such copolymers notably being selected from the group consisting of butadiene-stirene copolymers (SBR), isoprene-butadiene copolymers (BIR), isoprene-stirene copolymers (SIR) and isoprene-butadiene-stirene copolymers (SBIR).

One particularly preferred embodiment is to use an "isoprene" elastomer, which means to say a homopolymer or a copolymer of isoprene, in other words a diene elastomer selected from the group consisting of natural rubber (NR), synthetic polyisoprenes (IR), the various copolymers of isoprene and mixtures of these elastomers. The isoprene elastomer is preferably natural rubber or a synthetic polyisoprene of cis-1,4 type. Of these synthetic polyisoprenes, use is preferably made of polyisoprenes having a content (mol %) of cis-1,4 bonds higher than 90%, more preferably still, higher than 98%. According to one preferred embodiment, each layer of rubber composition contains 50 to 100 phr of natural rubber. According to other preferred embodiments, the diene elastomer may consist, fully or in part, of another diene elastomer such as, for example, an SBR elastomer which may or may not be cut with another elastomer, for example of the BR type.

The rubber composition may contain just one or several diene elastomer(s), it being possible for this (these) to be used in combination with any type of synthetic elastomer other than a diene elastomer, or even with polymers other than elastomers. The rubber composition may also contain all or some of the additives habitually used in rubber matrices intended for the building of tires, such as, for example reinforcing fillers such as carbon black or silica, coupling agents, anti-aging agents, antioxidants, plasticizers or extension oils, whether the latter are of aromatic or non-aromatic nature (notably oils which are very weakly or not at all aromatic, for example of the naphthene or paraffin oil type, of high or preferably low viscosity, MES or TDAE oils), plasticizing resins with a high Tg above 30° C., processability agents to aid the processing of compositions in the raw state, tackifying resins, anti-reversion agents, methylene acceptors and donors such as, for example, HMT (hexamethylene tetramine) or H3M (hexa(methoxymethyl) melamine), reinforcing resins (such as resorcinol or bismaleimide), known adhesion-promoting systems of the metal salt type for example, notably salts of cobalt, nickel or lanthanide, a crosslinking or vulcanizing system.

For preference, the crosslinking system for the rubber composition is a system known as a vulcanizing system, i.e. one based on sulphur (or a sulphur donor) and a primary vulcanization accelerator. Added to this basic vulcanizing system may be various known secondary accelerators or vulcanization activators. Sulphur is used at a preferential rate of between 0.5 and 10 phr, the primary vulcanization accelerator, for example a sulphenamide, is used at a preferential rate of between 0.5 and 10 phr. The level of reinforcing filler, for example carbon black or silica, is preferably higher than 50 phr and notably comprised between 50 and 150 phr.

All kinds of carbon black, notably blacks of HAF, ISAF, SAF type conventionally used in tires (so-called tire grade blacks) are suitable by way of carbon blacks. Among these, more particular mention will be made of carbon blacks of (ASTM) grade 300, 600 or 700 (for example N326, N330, N347, N375, N683, N772). Precipitated or pyrogenated silicas having a BET surface area less than 450 $m^2/g$, preferably of between 30 and 400 $m^2/g$ are notably suitable as silicas.

A person skilled in the art will know, from the present description, how to adjust the formulation of the rubber composition in order to achieve the desired property levels (notably elastic modulus) and how to adapt the formulation to suit the nature of the reinforcing layers and/or the surrounding polymer compounds such as, in particular, the layers of reinforcing elements in the crown reinforcement and the tread.

For preference, the rubber composition has, in the crosslinked state, a secant extension modulus, at 10% elongation, of between 4 and 25 MPa, more preferably between 4 and 20 MPa; values notably of between 5 and 15 MPa have proven to be particularly suitable for reinforcing the belts of tire covers. The modulus measurements are taken under tension, unless otherwise indicated, in accordance with standard ASTM D 412, 1998 (test specimen "C"): the "true" secant modulus (i.e. with respect to the actual cross-sectional area of the test specimen) is measured in second elongation (i.e. after one accommodation cycle) at 10% elongation and is here denoted Ms and expressed in MPa (normal temperature and humidity conditions in accordance with standard ASTM D 1349, 1999).

In the multilayer laminate according to the invention, the thickness of each layer of rubber is preferably between 0.05 and 2 mm, more preferably between 0.1 and 1 mm, and more preferably still, between 0.2 and 0.8 mm.

According to one preferred embodiment, in the multilayer laminate according to the invention, the thermoplastic polymer film is provided with a layer of adhesive facing each layer of rubber composition with which it is in contact.

In order to cause the rubber to bond to the thermoplastic polymer film, it is possible to use any appropriate adhesive system, for example a simple textile glue of the "RFL" (resorcinol-formaldehyde-latex) type containing at least one diene elastomer such as natural rubber, or any equivalent glue known to confer satisfactory adhesion between rubber and conventional thermoplastic fibers such as polyester or polyamide fibers.

By way of example, the process of applying the glue may essentially involve the following successive steps: passage through a bath of glue, followed by a draining (for example by blowing, calibrating) to remove the excess glue; then drying for example by passage through an oven (for example for 30 s at 180° C.) finally followed by heat treatment (for example for 30 s at 230° C.).

Before the above glue-coating step, it may be advantageous to activate the surface of the film, for example by a mechanical and/or physical and/or chemical route, in order to improve its uptake of glue and/or its ultimate adhesion to the rubber. A mechanical treatment might for example involve a prior step of peening or scoring the surface; a physical treatment might for example consist in a treatment with radiation such as an electron beam; a chemical treatment might for example involve passing it beforehand through a bath of epoxy resin and/or of isocyante compound.

Because the surface of the thermoplastic polymer film is, as a general rule, particularly smooth, it may also be advantageous to add a thickener to the glue used, in order to improve the overall take-up of glue by the film while it is being coated with glue.

A person skilled in the art will readily understand that, in the multilayer laminate, the connection between the thermoplastic polymer film and each layer of rubber with which it is in contact is provided definitively at the time of final curing (crosslinking) of the tire.

According to an alternative form of embodiment of the invention, the crown reinforcement of the tire is formed of at least two working crown layers of inextensible reinforcing elements which are crossed from one layer to the other, making with the circumferential direction angles of between 10° and 45°.

According to other alternative forms of embodiment of the invention, the crown reinforcement further comprises at least one layer of circumferential reinforcing elements.

According to any one of the abovementioned embodiments of the invention, the crown reinforcement may be further supplemented, radially on the inside between the carcass reinforcement and the radially inner working layer closest to the said carcass reinforcement, by a triangulation layer of inextensible steel metal reinforcing elements that make, with the circumferential direction, an angle greater than 60° and in the same direction as that of the angle formed by the reinforcing elements of the radially closest layer of the carcass reinforcement.

According to one advantageous embodiment of the invention, the axially discontinuous layer has an axial width less than the axial width of the least-wide working layer. According to this embodiment, the distance measured in the axial direction between the end of the narrowest working layer and the end of the axially discontinuous layer is greater than or equal to 10 mm. Such an embodiment is of economic benefit because it limits the width of the axially discontinuous layer and is of benefit in relation to the weight of the tire. Moreover, the inventors have been able to demonstrate that attacks suffered by the tire are more frequent in the central part of the tread. Having the axially discontinuous layer of a width that is narrower than the widths of the other layers of the crown reinforcement may thus be enough in terms of protection of said other layers.

According to another embodiment of the invention, the axially discontinuous layer has an axial width greater than the axial width of the least-wide working layer such that it overlaps the edges of the least-wide working layer.

Tests conducted on an axially discontinuous layer consisting of at least two bands each formed of at least one multilayer laminate according to the invention have also shown that, notably as a result of the thickness of the multilayer laminate being less than that of a protective layer containing reinforcing elements, the laminate also has the advantage of exhibiting very low hysteresis. Such a reduction in the hysteresis properties of this element of which the tire is made may make it possible to reduce the rolling resistance of the said tire.

Other advantageous details and features of the invention will become apparent hereinafter from the description of some exemplary embodiments of the invention given with reference to FIGS. 1 to 4 which depict.

For simplicity of understanding, the figures have not been drawn to scale.

Figure 1:
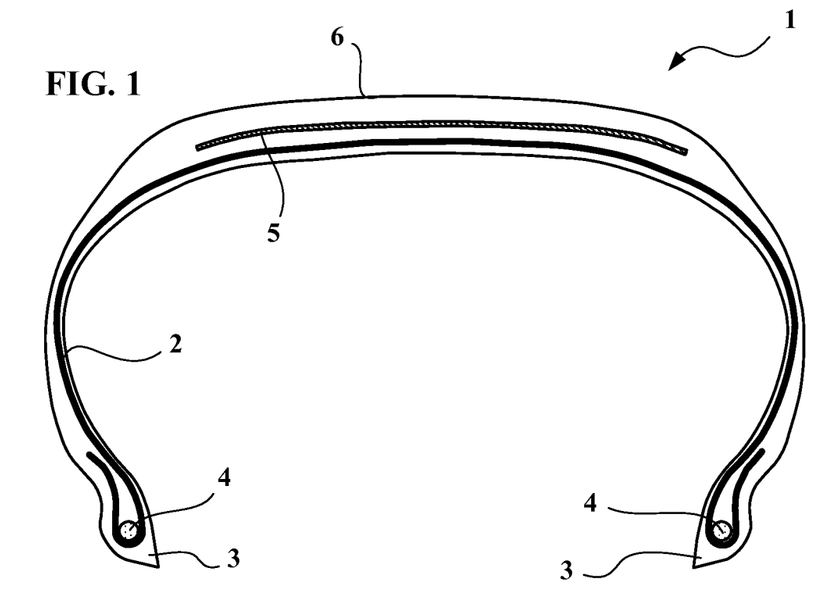
FIG. 1 a meridian view of a diagram of a tire according to the invention.

In FIG. 1, the tire 1, of size 315/70 R 22.5, comprises a radial carcass reinforcement 2 anchored in two beads 3 around bead wires 4. The carcass reinforcement 2 is formed of a single layer of metal cords. The carcass reinforcement 2 is hooped by a crown reinforcement 5, itself capped by a tread 6.

Figure 2:
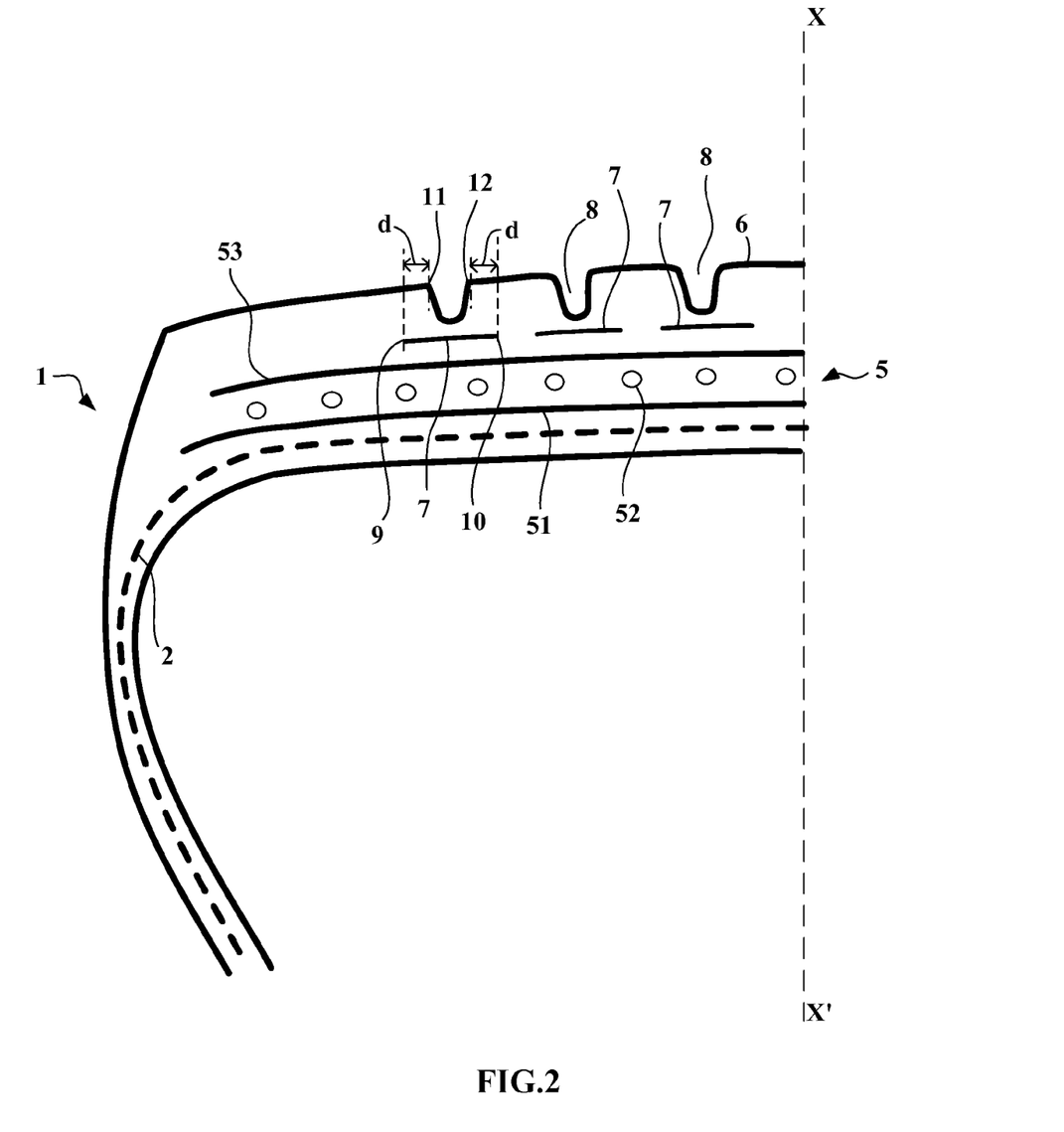
FIG. 2 a schematic depiction of a half view of the tire of FIG. 1, which is extended symmetrically about the axis XX' that represents the circumferential median plane or equatorial plane, FIG. 3 a schematic depiction of a view in cross section of a laminate according to the invention, FIG. 4 a schematic depiction of the junction between two laminates.

As illustrated in FIG. 2, the crown reinforcement 5 is formed radially from the inside outwards:

- of a first working layer 51 formed of non-wrapped inextensible metal cords 11.35 which are continuous over the entire width of the ply, oriented at an angle of 18°,
- of a layer 52 of circumferential reinforcing elements formed of metal cords made of steel 21×23, of "bimodulus" type,
- of a second working layer 53 formed of non-wrapped inextensible metal cords 11.35 which are continuous over the entire width of the ply, oriented at an angle of 18° and which are crossed with the metal cords of the first working layer,
- of an axially discontinuous layer made up of six bands 7 each formed of at least one multilayer laminate according to the invention. Just three bands have been depicted in FIG. 2 which corresponds to a half-view of the tire 1 of FIG. 1.

The multilayer laminate that makes up the six bands 7 is itself made up of a multiaxially stretched thermoplastic polymer film positioned between two layers of rubber with which it is in contact.

The tread comprises six grooves 8 or cutouts which are circumferentially continuous and radially superposed with the six bands 7, in accordance with the invention.

Each of the bands 7 has a width of 30 mm. The width of the bands 8 is, according to the invention between 20 and 40 mm.

The axially outer ends 9 and 10 of a band 7 are axially distant from the axially outermost points 11 and 12 of the grooves 8 by a distance d equal to 10 mm, and which is therefore between 4 and 12 mm according to the invention.

Figure 3:
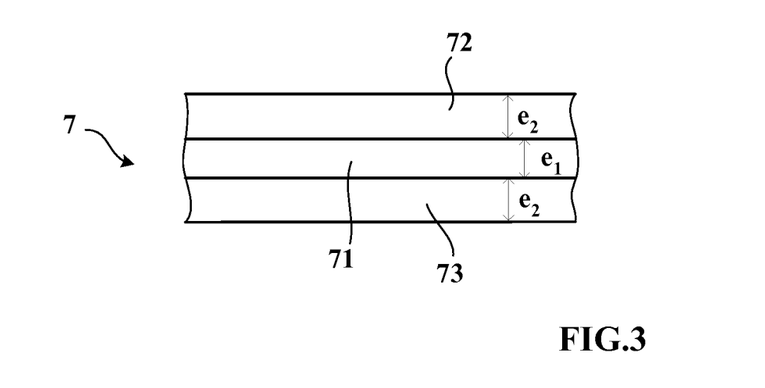

The multilayer laminate that makes up the six bands 7 as illustrated in greater detail in FIG. 3 consists of a biaxially stretched PET film 71 of thickness $e_1$ equal to around 0.35 mm, "sandwiched" between two layers 72, 73 of rubber composition of thickness $e_2$ equal to around 0.4 mm, the laminate 9 therefore having an overall thickness ($e_1+2e_2$) of around 1.15 mm. The rubber composition used is a composition that is conventional in the calendering of metal belting plies for pneumatic tire covers based on natural rubber, carbon black, a vulcanizing system and the usual additives. Adhesion between the PET film and each layer of rubber is ensured by a glue of the RFL type which has been applied in the known way as indicated earlier.

Figure 4:
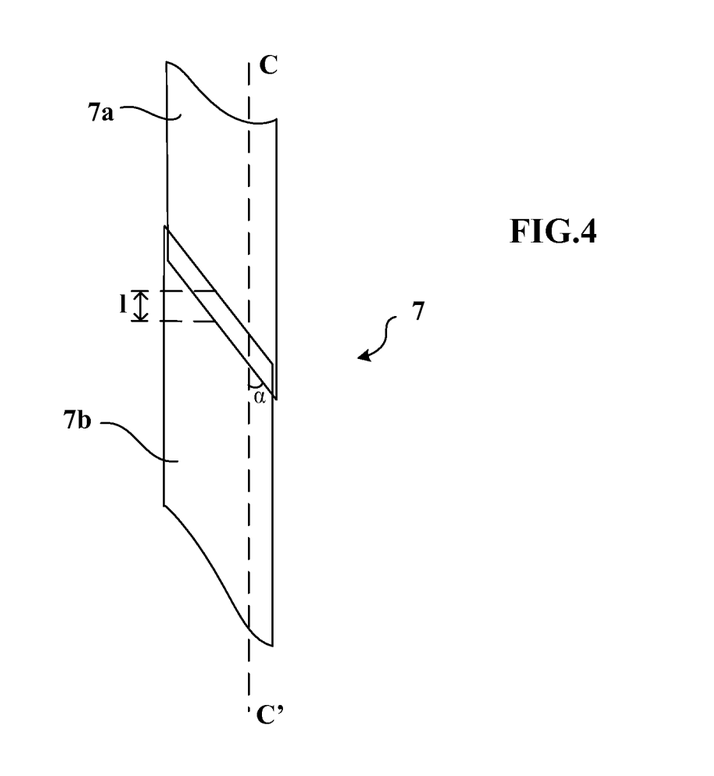

FIG. 4 very schematically illustrates the junction between two segments 7a and 7b that make up a band 7 over one revolution of the wheel, each of the segments covering a sector of around 180° in this particular instance. To make the figure easier to understand, the edges of the two segments have been offset slightly. After curing, the ends of the segments 7a and 7b remain radially superposed over a length l of 5 mm measured in the circumferential direction CC'.

According to the invention, the end of the segments 7a and 7b is oriented at an angle α equal to 18° with respect to the circumferential direction CC' that is identical to the angle formed by the reinforcing elements of the working layer 53 with respect to the circumferential direction.

The multiaxially stretched thermoplastic polymer film has, whatever direction of tension is considered, the following mechanical properties:

- an extension modulus E higher than 500 MPa;
- a maximum tensile stress $\sigma_{max}$ higher than 100 MPa;
- a plastic deformation threshold Yp of between 5 and 10%;
- an elongation at break denoted Ar greater than 50%.

The quality of the protection conferred by the multilayer laminate can be assessed in what is known as a penetration test which involves measuring the resistance to penetration by a penetration probe. The principle behind this test is well known and described for example in standard ASTM F1306-90.

During comparative penetration tests the following were tested:

- on the one hand, a multilayer laminate as described hereinabove;
- and on the other hand, for comparison, a layer of reinforcing elements usually used as a protective layer in heavy goods vehicle tires. It is made up of metal reinforcing elements laid parallel to one another in a plane, at a laying spacing of around 2.5 mm. The reinforcing elements are coated in two layers of calendering rubber to form on the back of the cords a thickness equal to $e_2$, namely around 0.4 mm.

The reinforcing elements of this layer habitually used as a protective layer are multistrand ropes of so-called "6×0.35" or "3×2×0.35" construction, which means to say ropes each made up of three strands of two threads of diameter 0.35 mm, assembled with one another by cabling to form elastic metal cords. The overall diameter (or envelope diameter) of these cords is around 1.4 mm which means that the final metal fabric has an overall thickness of around 2.2 mm.

The metal penetration probe used is of cylindrical shape (diameter 4.5±0.05 mm), conical at its end (cone angle of 30°±2) and truncated to a diameter of 1 mm. The composite test specimen tested (multilayer laminate according to the invention or control metal fabric) was fixed to a metal support 18 mm thick which was pierced, in line with the penetration probe, with a hole of diameter 12.7 mm in order to allow the penetration probe to pass freely through the perforated test specimen and its backing plate.

In order to characterize resistance to penetration, the force-displacement curve of the above penetration probe (fitted with sensors connected to the tensile test machine) passing through the test specimen at a velocity of 10 cm/min was recorded.

The table below provides detail of the measurements recorded, the base 100 being adopted for the control composite: the bending modulus represents the initial gradient of the force-displacement curve; the penetration force is the maximum force recorded before the tip of the penetration probe penetrated the test specimen; the elongation at penetration is the relative elongation recorded at the instant of penetration.

|  | Thickness (mm) | Bending modulus | Force at penetration | Elongation at penetration |
| --- | --- | --- | --- | --- |
| Control | 2.20 | 100 | 100 | 100 |
| Invention | 1.15 | 93 | 92 | 103 |

From studying this table it will be noted that the multilayer laminate according to the invention, despite having a thickness reduced practically by half by comparison with the control solution and despite the absence of reinforcing threads, has a resistance to penetration that is almost equivalent to that of the conventional metal fabric.

Running tests were carried out on tires produced according to the invention as depicted in the figures, and others using so-called reference tires.

The reference tires differ from the tires according to the invention through the presence of a protective layer as described hereinabove in place of the axially discontinuous layer consisting of six bands 7 each formed of at least one multilayer laminate.

Drum running endurance tests were carried out on a test machine that imposed a load of 4415 daN and a speed of 40 km/h on the tires. The tests were carried out on the tires according to the invention under conditions identical to those applied to the reference tires. Running was stopped as soon as the tires began to show degradation.

The tests thus carried out showed that the distances covered in each of these tests are substantially the same for the tires according to the invention and for the reference tires; the distances covered are of the order of 250 000 km.

Moreover, for the size considered during the testing, the mass of the laminate is approximately twelve times lighter than that of a protective layer and leads to a saving of around 3.5% on the mass of the tire.

Likewise, the cost of the laminate is at least three times less expensive than that of the layer of reinforcing elements and leads to a saving of around 3% on the cost price of the tire.

The invention claimed is:

1. A tire with radial carcass reinforcement, made up of at least one layer of metal reinforcing elements, the tire comprising:
    a crown reinforcement,
    a tread radially capping the crown reinforcement, comprising at least two circumferentially continuous cutouts,
    two beads connected to the tread via two sidewalls,
    wherein the crown reinforcement comprises at least one axially discontinuous layer consisting of at least two bands axially distant from one another, and each formed of at least one multilayer laminate,
    wherein the laminate comprises at least one multiaxially stretched thermoplastic polymer film positioned between, and in contact with, two layers of rubber composition, and wherein, in a meridian plane, axial ends of each of the bands are respectively axially on the outside of each of the axially outermost points of one same circumferentially continuous cutout, wherein the axial distance between an axial end of a band and the axially outermost point of the circumferentially continuous cutout axially closest to the end of the band is between 4 and 12 mm;
    wherein at least one band is disposed radially beneath at least one circumferentially continuous cutout; and
    wherein the thermoplastic polymer is a polyester,
    the crown reinforcement of the tire comprises at least two multilayer laminates positioned in contact with one another circumferentially to form a circumferentially continuous band, and
    the ends of the at least two multilayer laminates in the circumferential direction have a cutout that makes with the circumferential direction an angle substantially equivalent to that of the reinforcing elements of the crown reinforcing layer radially closest to the at least two laminates.

2. The tire according to claim 1, wherein the bands forming the axially discontinuous layer have widths of between 20 and 40 mm.

3. The tire according to claim 1, wherein the thermoplastic polymer film has, whatever direction of tension is considered, an extension modulus denoted E that is greater than 500 MPa.

4. The tire according to claim 1, wherein the thermoplastic polymer film has, whatever direction of tension is considered, a maximum tensile stress denoted σmax which is greater than 80 MPa.

5. The tire according to claim 1, wherein the thermoplastic polymer film has, whatever direction of tension is considered, an elongation at break denoted Ar which is greater than 40%.

6. The tire according to claim 1, wherein the thermoplastic polymer film is heat stabilized.

7. The tire according to claim 1, wherein the polyester is a polyethylene terephthalate or a polyethylene naphthalate.

8. The tire according to claim 1, wherein the thickness of the thermoplastic polymer film is between 0.05 and 1 mm.

9. The tire according to claim 1, wherein the thickness of each layer of rubber composition is between 0.05 and 2 mm.

10. The tire according to claim 1, wherein the crown reinforcement is formed of at least two working crown layers of inextensible reinforcing elements which are crossed from one layer to the other, making with the circumferential direction angles of between 10° and 45°.

11. The tire according to claim 1, wherein the crown reinforcement comprises at least one layer of circumferential reinforcing elements.

12. The tire according to claim 1, wherein the crown reinforcement further comprises a triangulation layer formed of metal reinforcing elements that make with the circumferential direction angles of greater than 60°.

* * * * *